(No Model.)
H. HUVELLE.
PROCESS OF AND APPARATUS FOR MAKING ESSENCES.
No. 487,837. Patented Dec. 13, 1892.
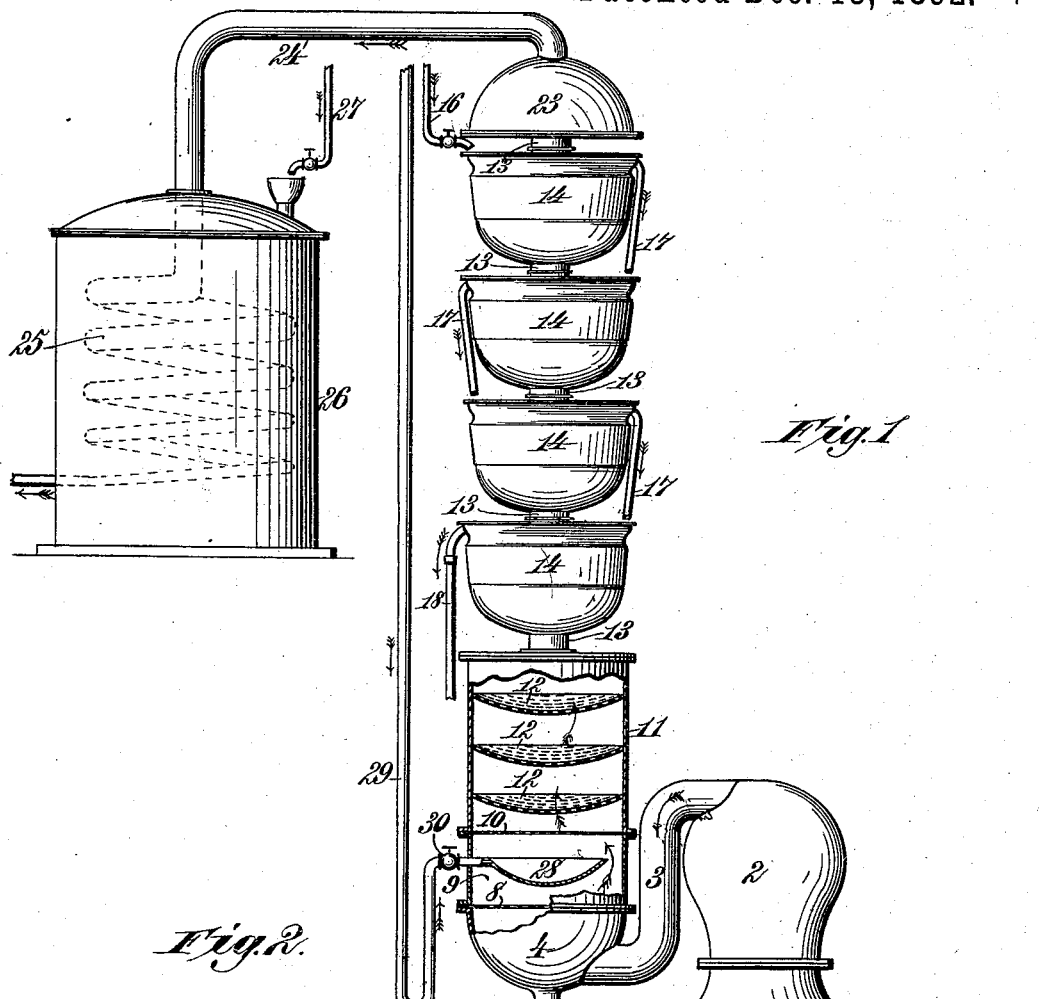
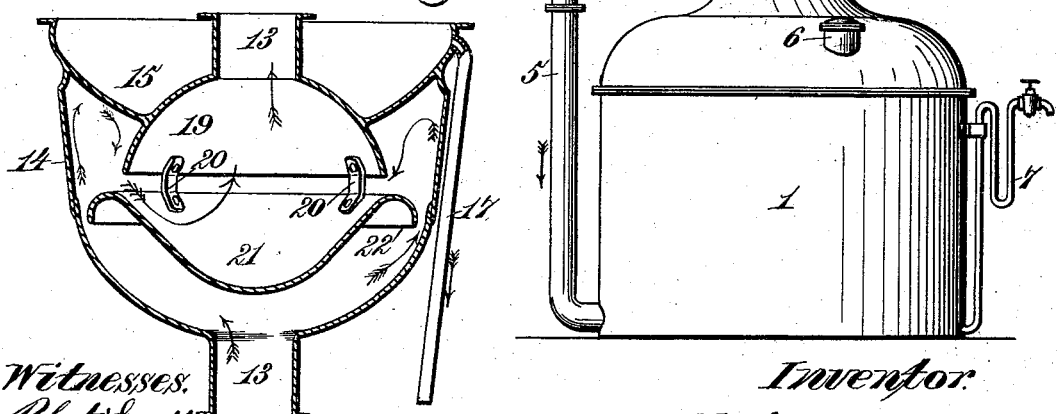

UNITED STATES PATENT OFFICE.

HECTOR HUVELLE, OF WEATHERFORD, TEXAS, ASSIGNOR OF ONE-HALF TO GUSTAVUS A. TANDY, OF SAME PLACE.

PROCESS OF AND APPARATUS FOR MAKING ESSENCES.

SPECIFICATION forming part of Letters Patent No. 487,837, dated December 13, 1892.

Application filed July 3, 1891. Serial No. 398,430. (No model.)

*To all whom it may concern:*

Be it known that I, HECTOR HUVELLE, a citizen of the United States, residing at Weatherford, in the county of Parker and State of Texas, have invented new and useful Improvements in the Process of and Apparatus for Making Essences, of which the following is a specification.

My invention relates to an improved process of and apparatus for making essences by distillation, whereby the flavors, strength, and odors of plants, herbs, roots, and seeds can be thoroughly and economically obtained for medicinal and other purposes.

In order to enable others skilled in the art to practice my invention, I will describe the same with reference to the annexed drawings, in which—

Figure 1 is a partly-sectional elevation of a distilling apparatus embodying my improvements. Fig. 2 is a sectional detail view of one of the condensing-cups, forming part of the apparatus.

Referring to the drawings, the numeral 1 designates a still of suitable form, in which is placed the liquid to be vaporized. This liquid may consist of water, alcohol, or ether. On the top of the still or vessel 1 and communicating therewith is a dome 2, that communicates by a conduit 3 with a regulating-chamber 4, in which the solvent vapors from the still are received.

The still 1 is heated by a furnace or other suitable means, (not shown,) and should the heat be very great, so that any liquid is forced through the conduit 3 into the chamber 4, it will be conducted thence by a pipe 5, leading into the lower part of the still. This pipe 5 also affords a passage for returning to the still the denser products of distillation. The still is provided with an inlet 6 and with a valved pipe 7 for drawing off waste liquid. Supported on the chamber 4 and separated therefrom by a perforated plate 8 is a chamber 9, above which and separated therefrom by a perforated plate 10 is a chamber 11, which may be of somewhat greater height than the lower chambers 4 and 9. In this upper chamber 11 are a series of perforated diaphragms or screens 12, on which are placed the plants, herbs, roots, or seeds that are to be treated for the purpose of obtaining their virtues or essences. The vapor rising from the liquid contents of the still 1 and passing through the chambers 4 and 9 enters the bottom of the chamber 11 and rising in a heated state through the herbs or other vegetable materials supported in said chamber extracts their strength or virtues and their peculiar flavors and odors. After passing through the contents of the volatilizing-chamber 11 the heated vapors, charged with volatilized matters, enter the lower end of the sectional column 13, that connects a vertical series of condensing and redistilling cups 14, that are so constructed as to form separate passages for the water and for the vapors of distillation.

In Fig. 2 is shown a sectional detail view of one of the condensing and redistilling cups. Each of these cups 14 is formed with a dished or concave top 15, that forms a receptacle for water. The concave top 15 of the uppermost cup in the series is supplied with cold water through a valved pipe 16, leading from a suitable reservoir. (Not shown). The overflow-water from the upper cup or cups passes into the lower cups through overflow-pipes 17, and the lower cup of the series is provided with a waste-pipe or outlet 18, through which the water that is warmed by its descent through the successive cups escapes. The sectional column or pipe 13 is connected centrally with the bottom of the water-receptacle 15 of one cup and with the bottom of the next cup above. Within each cup 14 is a dome-shaped partition 19, that communicates with the lower end of a section of the pipe or column 13, and from the lower edge of this dome-shaped partition 19 is suspended by lugs 20 a concaved partition 21, having an outwardly rolled and depending rim 22, and forming, with the dome 19 and the outer wall or casing of the cup 14, a tortuous passage for the vapors that are conducted, successively, through the several cups. As the vapors rise through the successive cups and come in contact with the cooled under sides of the water-receptacles 15 partial condensation takes place, the heavier portions of the vapor being condensed and thrown down into the concave partitions 21, which serve as pockets or receptacles, in which the partly-condensed material is reheated by the vapors that pass in contact with the under side of said receptacle. The lighter vapors pass upward into the next cup, mingled with any vapors resulting from the reheating of the contents of the receptacle 21, and thus after repeated condensation and reheating the vapors from the volatilizing-chamber 11 traverse the series of cups 14 from below upward.

In Fig. 1 I have shown a series of five condensing and redistilling cups 14; but it is obvious that any greater or less number may be employed.

Above the upper cup 14, and communicating with the uppermost section of the pipe or column 13, is a dome-shaped collector 23, which communicates by a pipe 24 with a worm 25 in a condensing-vessel 26, that may be supplied with cold water through a pipe 27 or otherwise.

If desired, the chamber 9 may inclose a cup 28, which can be supplied with water, alcohol, or ether through a pipe 29, having a hand-valve 30. The contents of the cup 28 will be vaporized by the heat from the still, and the vapors thus produced will ascend, together with the solvent vapors, from the still and will penetrate the vegetable materials supported on the screens 12, so as to obtain their virtues, while the heavy liquids will drop into chamber 4 and pass thence through the pipe 5 into the still. In the successive cups 14 the solvent vapors and mingled volatile matters will be repeatedly condensed and reheated, and finally in the condenser 26 will be collected the essences resulting from the action of the apparatus on the materials under treatment. By means of the treatment above described pure essences of celery, ginger, and other plants can be economically produced with the employment of a small proportion of alcohol. With one quart of 94-proof spirit and two quarts of water to one hundred and twenty-five grams of roots or seeds a very strong essence can be made by the repeated condensing and reheating of the solvent vapors in the manner described.

What I claim as my invention is—

1. The process of making essences, which consists in passing solvent vapors from a still through a body of vegetable substances, repeatedly and continuously condensing and reheating the mingled vapors and volatile matters, and finally condensing the vapors and collecting the distillate, substantially as described.

2. The combination, with a still 1 and a receiving or regulating chamber 4, connected with a still by a conduit 3 and return-pipe 5, of the chamber 9, supported on the chamber 4, the chamber 11, supported on the chamber 9 and provided with a vertical series of perforated diaphragms 12, the vertical series of condensing-cups 14, the sectional pipe or column 13, connecting said cups with each other and with the chamber 11, and the condenser 26, connected with the uppermost cup of the series, substantially as described.

3. The combination, with the still 1 and the chambers 4, 9, and 11, communicating with each other and with the still, of a series of perforated diaphragms or screens 12, located in the uppermost chamber 11, a vertical series of condensing-cups 14, the sectional pipe or column 13, connecting said cups, the dome 23, and the condenser 26, substantially as described.

4. The combination, with the still 1 and a series of chambers communicating with each other and with the still, of a vertical series of perforated diaphragms 12, located in the uppermost chamber, a series of condensing-cups 14, located above said chambers and each having a water-receptacle 15 and concaved partitions 19 and 21, forming a tortuous passage for vapor and a receptacle for the condensed heavier products of distillation, the sectional pipe or column 13, connecting the vapor-passages of said cups, the overflow-pipes 17, connecting the water-receptacles of the cups, a pipe 16 for supplying cold water to the upper cup of the series, and the condenser 26, substantially as described.

5. The combination, with the still 1 and the chamber 4, communicating with the still, of the chamber 9, supported on and communicating with the chamber 4, the cup 28, supported in the chamber 9, the valved pipe 29, leading to said cup, the chamber 11, supported on and communicating with the chamber 9 and provided with perforated diaphragms 12, the vertical series of condensing-cups 14, and the condenser 26, substantially as described.

In testimony whereof I have hereunto set my hand and affixed my seal in presence of two subscribing witnesses.

HECTOR HUVELLE. [L. S.]

Witnesses:
CHAS. F. STITZ,
J. B. PRICE.